(12) United States Patent
Zyskind

(10) Patent No.: US 10,514,803 B2
(45) Date of Patent: Dec. 24, 2019

(54) PEN IN FIELD FORCE SENSING CALIBRATION

(71) Applicant: Microsoft Technology Licensing, LLC, Redmond, WA (US)

(72) Inventor: Amir Zyskind, Natania (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 199 days.

(21) Appl. No.: 15/062,124

(22) Filed: Mar. 6, 2016

(65) Prior Publication Data
US 2017/0255328 A1    Sep. 7, 2017

(51) Int. Cl.
*G06F 3/041* (2006.01)
*G06F 3/0354* (2013.01)
*G06F 3/044* (2006.01)
*G06F 3/038* (2013.01)

(52) U.S. Cl.
CPC .......... *G06F 3/0418* (2013.01); *G06F 3/0383* (2013.01); *G06F 3/03545* (2013.01); *G06F 3/044* (2013.01); *G06F 3/0412* (2013.01); *G06F 3/0414* (2013.01); *G06F 3/0416* (2013.01)

(58) Field of Classification Search
CPC .... G06F 3/0418; G06F 3/0383; G06F 3/0416; G06F 3/044; G06F 3/03543; G06F 3/03545; G06F 3/0354; G06F 2203/0382; G06F 2203/04104
See application file for complete search history.

(56) References Cited

U.S. PATENT DOCUMENTS

| | | |
|---|---|---|
| 8,414,210 B2 | 4/2013 | Silverbrook et al. |
| 8,477,103 B2 | 7/2013 | Townsend et al. |
| 8,481,872 B2 | 7/2013 | Zachut |
| 8,493,359 B2 | 7/2013 | Wright et al. |
| 8,536,471 B2 | 9/2013 | Stern et al. |
| 8,539,383 B2 | 9/2013 | Zotov et al. |
| 8,547,350 B2 | 10/2013 | Anglin et al. |
| 8,866,767 B2 | 10/2014 | Shahpamia et al. |
| 8,922,530 B2 | 12/2014 | Pance |
| 8,928,635 B2 | 1/2015 | Harley et al. |

(Continued)

FOREIGN PATENT DOCUMENTS

| | | | | |
|---|---|---|---|---|
| EP | 2172834 A3 | * | 3/2013 | ......... G06F 3/03545 |
| WO | 0063835 A2 | | 10/2000 | |

(Continued)

OTHER PUBLICATIONS

International Search Report and the Written Opinion dated Jul. 26, 2017 From the International Searching Authority Re. Application No. PCT/US2017/019793. (12 Pages).

(Continued)

*Primary Examiner* — Bryan Earles

(57) ABSTRACT

A method for identifying an error in a tip status indication from a stylus includes detecting input from a stylus with a digitizer sensor via an electrostatic (ES) wireless communication channel established between said stylus and said digitizer sensor. An indication of a tip status is received from the stylus, indicating whether the tip status is in hover or touch. The tip status is verified based on input detected with the digitizer sensor. When an error is identified in the tip status indication, a notification of the error is sent.

20 Claims, 6 Drawing Sheets

(56) References Cited

U.S. PATENT DOCUMENTS

| | | | |
|---|---|---|---|
| 9,013,429 | B1 | 4/2015 | Krekhovetskyy et al. |
| 9,018,547 | B2 | 4/2015 | Rimon et al. |
| 9,329,767 | B1* | 5/2016 | Teller .................. G02B 27/017 |
| 9,921,626 | B2 | 3/2018 | Bentov |
| 2010/0001962 | A1 | 1/2010 | Doray et al. |
| 2010/0051356 | A1 | 3/2010 | Stern et al. |
| 2012/0068964 | A1 | 3/2012 | Wright et al. |
| 2012/0154340 | A1* | 6/2012 | Vuppu ................ G06F 3/03545 345/179 |
| 2013/0176270 | A1 | 7/2013 | Cattivelli et al. |
| 2013/0257793 | A1 | 10/2013 | Zeliff et al. |
| 2013/0265265 | A1 | 10/2013 | Stern |
| 2014/0049478 | A1 | 2/2014 | Brunet et al. |
| 2014/0347311 | A1 | 11/2014 | Joharapurkar et al. |
| 2014/0362035 | A1 | 12/2014 | Mo et al. |
| 2015/0029136 | A1 | 1/2015 | Shahparnia |
| 2015/0035768 | A1 | 2/2015 | Shahpamia et al. |
| 2015/0050879 | A1* | 2/2015 | MacDuff .............. H04W 12/06 455/39 |
| 2015/0177868 | A1 | 6/2015 | Morein et al. |
| 2015/0363012 | A1* | 12/2015 | Sundara-Rajan ....... G06F 3/038 345/179 |
| 2016/0154507 | A1 | 6/2016 | Bharathan et al. |
| 2016/0209940 | A1* | 7/2016 | Geller .................. G06F 3/0416 |
| 2016/0306444 | A1* | 10/2016 | Fleck .................... G06F 3/0383 |
| 2017/0131798 | A1* | 5/2017 | Geaghan ............... G06F 3/0383 |
| 2017/0255282 | A1 | 9/2017 | Winebrand et al. |

FOREIGN PATENT DOCUMENTS

| | | | | |
|---|---|---|---|---|
| WO | WO 2012123951 | A2 * | 9/2012 | ......... G06F 3/03545 |
| WO | 2013165466 | A1 | 11/2013 | |
| WO | 2014092758 | A1 | 6/2014 | |
| WO | 2014145872 | A1 | 9/2014 | |
| WO | 2014188417 | A2 | 11/2014 | |
| WO | WO 2015/036999 | | 3/2015 | |

OTHER PUBLICATIONS

"HP Active Pen", Retrieved From: https://store.hp.com/us/en/pdp/hp-active-pen, Retrieved on: Nov. 6, 2015, 8 Pages.

"Final Office Action Issued in U.S. Appl. No. 15/062,127", dated Feb. 8, 2018, 17 Pages.

"Non Final Office Action Issued in U.S. Appl. No. 15/062,127", dated Apr. 30, 2018, 26 Pages.

"Non Final Office Action Issued in U.S. Appl. No. 15/062,127", dated Aug. 17, 2017, 15 Pages.

Campbell, Mikey, "Apple Investigating Stylus with Extendable 'Multitouch' Nib, Onboard Light and Motion Sensors", Retrieved From: http://appleinsider.com/articles/14/03/20/apple-investigating-stylus-with-extendable-multitouch-nib-onboard-light-and-motion-sensors, Mar. 20, 2014, 6 Pages.

Hinckley, et al., "Motion and Context Sensing Techniques for Pen Computing", In Proceedings of the Graphics Interface, May 29, 2013, 8 Pages.

Hsu, et al., "An Inertial Pen with Dynamic Time Warping Recognizer for Handwriting and Gesture Recognition", In Proceedings of the IEEE Sensors Journal, vol. 15, Issue 1, Jan. 1, 2015, 10 Pages.

John, Tony, "Review of E-Touch Pen: A Smart Gadget to Use Windows 8 on Non-Touch Computers", Retrieved From: http://www.techulator.com/resources/9221-Hi-Tech-Solutions-e-Touch-Pen-Reviews.aspx, Mar. 14, 2013, 5 Pages.

Lettner, et al., "Heat Maps as a Usability Tool for Multi-Touch Interaction in Mobile Applications", In Proceedings of the 11th International Conference on Mobile and Ubiquitous Multimedia, Dec. 4, 2012, 2 Pages.

Mahony, et al., "A Real-Time System for Sensor Information Interactive Visualization with Multi-Touch Technology", In Proceedings of the IEEE International Conference on Virtual Environments Human-Computer Interfaces and Measurement Systems, Sep. 6, 2010, 5 Pages.

Molina-Rueda, et al., "Using Heat Maps for Studying User Preferences in Vertical and Horizontal Multi-Touch Surfaces", In Proceedings of the International Conference on Electronics, Communications and Computing, Mar. 11, 2013, 6 Pages.

"International Search Report and Written Opinion Issued in PCT Application No. PCT/US2017/019794", dated Jun. 12, 2017, 13 Pages.

Pinola, Melanie, "Microsoft Patents an Advanced Multi-Touch Stylus", Retrieved From: https://web.archive.org/web/20120923163726/http://www.pcworld.com/article/261510/microsoft_patents_an_advanced_multi_touch_stylus.html, Retrieved on: Sep. 23, 2012, 7 Pages.

Song et al. "Grips and Gestures on a Multi-Touch Pen", In Proceedings of the SIGCHI Conference on Human Factors in Computing Systems, May 7, 2011, 10 Pages.

Vatavu, et al., "Gesture Heatmaps: Understanding Gesture Performance with Colorful Visualizations", In Proceedings of the 16th International Conference on Multimodal Interaction, Nov. 12, 2014, 8 Pages.

"Office Action Issued in Colombian Patent Application No. NC2018/0009347", dated Apr. 29, 2019, 12 Pages.

"Office Action Issued in Indonesian Patent Application No. P00201806863", dated Sep. 19, 2019, 3 Pages.

"Office Action Issued in Chile Patent Application No. 201802468", dated Sep. 17, 2019, 10 Pages.

* cited by examiner

PEN IN FIELD FORCE SENSING CALIBRATION

BACKGROUND

Signal emitting styluses, e.g. active styluses, are known in the art for use with a digitizer system. Position detection of the stylus provides input to a computing device associated with the digitizer system and is interpreted as user commands. Often, the digitizer system is integrated with a display screen, e.g. to form a touch screen. Position of the stylus over the screen is correlated with virtual information portrayed on the screen. The signal emitted by the stylus may include information such as pressure applied on the writing tip and stylus identification. The signal is decoded by the digitizer system to obtain the information.

Digitizer systems typically include a matrix of electrode junctions arranged in rows and columns. Stylus location may be tracked by sampling output in both row and column direction. Tracking is based on detecting a signal emitted by a tip of the stylus and picked up by the digitizer sensor due to electrostatic coupling established between the tip and a portion of the matrix of electrode junctions. Digitizer systems that track signals emitted by the stylus also typically track input provided with a finger or conductive object. A mutual capacitive sensor is one type of digitizer sensor for such digitizer systems. Mutual capacitive detection allows multi-touch operation where multiple fingers, palms or conductive objects are tracked at the same time.

SUMMARY

Some embodiments of the disclosure relate to identifying when a stylus senses its tip status incorrectly. This typically occurs when the tip remains retracted in the stylus even though the tip is not in contact with the digitizer sensor or display screen. The digitizer sensor determines whether the tip is in contact with the screen or digitizer sensor and compares it to a tip status indication received from the stylus. A notification is sent (typically to the stylus) when an error is detected in the tip status reported by the stylus. In response to a notification, the stylus may recalibrate the sensor it uses to determine the tip status in order to reflect the correct status.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Styluses for digitizer sensors incorporate mechanisms that typically require external equipment for calibration. An example is the tip force sensor which is a sensitive electromechanical mechanism. The tip force sensor is calibrated in the production line to set the no-force-applied point according to which the pen can distinguish whether the tip status is hover or touch mode. In some cases of mechanical problem, the pen falsely identifies its tip status as touch even though no force is being applied to the tip. This situation is referred to as "inking in hover".

In embodiments in the disclosure, the stylus identifies its status and sends an indication of the tip status to the digitizer sensor. The digitizer sensor uses its own mechanisms to verify whether the stylus is or is not touching the digitizer sensor. When there is a conflict between the tip status indicated by the stylus and the tip status determined by the digitizer sensor, the digitizer sensor identifies an error and sends one or more notifications of the error. These notifications allow various parts of the system to take action to correct the error.

For example, the digitizer sensor may send a notification to the stylus to calibrate its pressure sensor. The notification may be sent on a wireless uplink channel from the digitizer sensor or from the host computing device including the digitizer sensor to the stylus. The type of uplink channels used to send the notification to the stylus depends on the stylus capabilities, for example whether it has an electrostatic (ES), Bluetooth (BT) and/or other type of wireless interface. When the stylus performs the calibration, the inking in hover problem is resolved.

In other examples, an alert message is also sent to the user, e.g. the alert message is displayed on the screen of the host computing device. Alternately or additionally, a notification is sent to the host in order to trigger the host to perform appropriate actions to recover from the incorrect tip status.

Figure 1:
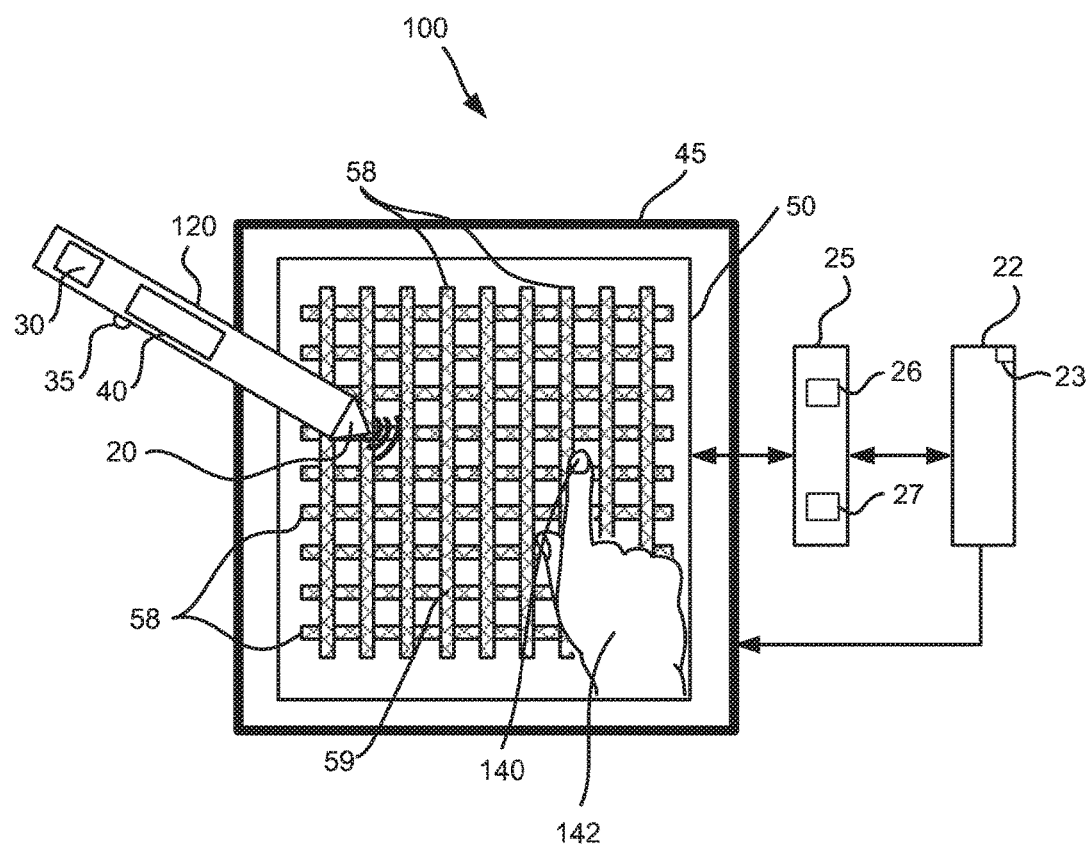
FIG. 1 is a simplified block diagram of an exemplary touch enabled computing device in accordance with some embodiments of the present disclosure.

Reference is now made to FIG. 1 showing a simplified block diagram of an exemplary touch enabled computing device in accordance with some embodiments of the present disclosure. According to some embodiments of the present disclosure, a computing device 100 includes a display 45 that is integrated with a digitizer sensor 50.

In some exemplary embodiments, digitizer sensor 50 is a grid based capacitive sensor formed with row and column conductive strips 58 forming grid lines of the grid based sensor. Typically, conductive strips 58 are electrically insulated from one another and each of conductive strips is connected at least at on one end to digitizer circuitry 25. Typically, conductive strips 58 are arranged to enhance capacitive coupling between row and column conductive strips, e.g. around junctions 59 formed between rows and columns. The capacitive coupling formed between the row and column conductive strips is sensitive to presence of conductive and dielectric objects. Alternatively, digitizer sensor formed with a matrix of electrode junctions that is not necessarily constructed based on row and column conductive strips. In other arrangements, the digitizer sensor does not include defined row/column separations but rather multiple pads where each pad is a junction and stylus touch status and/or location are determined by self capacitance.

Embodiments of the invention are not limited to a particular layout, type or arrangement of electrodes and/or electrode junctions in the digitizer sensor.

According to some embodiments of the present disclosure, conductive strips 58 are operative to detect touch of one or more fingertips 140 or hand 142 or other conductive objects as well as input by stylus 120 transmitting an electromagnetic signal typically via the writing tip of the stylus. Typically, output from both row and column conductive strips 58, e.g. from two perpendicular axes are sampled to detect coordinates of stylus 120. Some digitizers use an ES uplink signal from the digitizer to the stylus by which the coordinate of either the row or column location is defined. Based on the stylus signal the other axis location is determined. In this arrangement, only output from one axis is sampled.

In some exemplary embodiments, digitizer circuitry 25 typically includes a stylus detection engine 27 for synchronizing with stylus 120, for processing input received by stylus 120, for decoding indication of tip status (e.g. tip pressure information transmitted by stylus 120) and/or for tracking coordinates of stylus 120. In some cases, stylus 120 synchronizes with digitizer circuitry 25, in which case synchronization may not be required at stylus detection engine 27.

Input received by stylus 120 may include information directly related to stylus 120, related to an environment around the stylus 120, to a user using stylus 120, to privileges allotted to the stylus 120, capabilities of stylus 120, or information received from a third party device. Information related to the stylus may include indications of a pressed button(s) 35, pressure level on tip 20, tilt, identification, manufacturer, version, media access control (MAC) address, and stored configurations such as color, tip type, brush, and add-ons.

Typically, tip 20 is located at the frontal end of stylus 120. However a tip may be located on any portion of the stylus which the user uses to touch or hover over the digitizer screen. For example, stylus 120 may include a second tip at the opposite end of stylus 120 and the pressure level and the pressure level applied on the second tip is also recorded and transmitted.

Typically, stylus 120 includes an ASIC 40 that controls generation of a signal emitted by stylus 120. ASIC 40 typically encodes information generated, stored or sensed by stylus 120 on the signal transmitted by stylus 120. Typically, stylus detection engine 27 decodes information received from stylus 120. Optionally, other handheld devices configured to interact with digitizer sensor 50 may be operated in a similar manner and tracked by stylus detection engine 27.

Digitizer circuitry 25 may apply mutual capacitance detection or a self-capacitance for sensing a touch signal from touch (or hover) of fingertip 140. Typically, during mutual capacitance and self-capacitance detection, digitizer circuitry 25 sends a triggering signal, e.g. pulse to one or more conductive strips 58 of digitizer sensor 50 and samples output from conductive strips 58 in response to the triggering and/or interrogation. In some embodiments, some or all of conductive strips 58 along one axis of the grid are triggered simultaneously or in a consecutive manner, and in response to each triggering, outputs from conductive strips 58 on the other axis are sampled. Typically, this procedure provides for detecting coordinates of multiple fingertips 140 touching sensor 50 at the same time (multi-touch). Digitizer circuitry 25 typically includes finger detection engine 26 for managing the triggering signal, for processing the touch signal and for tracking coordinates of one or more fingertips 140.

Typically, output from digitizer circuitry 25 is reported to host 22. Typically, the output provided by digitizer circuitry 25 may include coordinates of one or more fingertips 140, coordinates of writing tip 20 of stylus 120 and additional information provided by stylus 120, e.g. pressure, tilt, and battery level. Typically, digitizer circuitry 25 uses both analog and digital processing to process signals detected with digitizer sensor 50. Optionally, some and/or all of the functionalities of engines 26 and 27 are integrated in one or more processing units adapted for controlling operation of digitizer sensor 50. Optionally, some and/or all of the functionalities of digitizer circuitry 25, engines 26 and 27 are integrated and/or included in host 22. Host 22 may transmit the information to an application manager or a relevant application. Optionally, circuit 25 and host 22 may transfer the raw information to an application. The raw information may be analyzed or used as needed by the application. At least one of stylus 120, circuit 25 and host 22 may pass on the raw information without analysis or being aware of the information.

According to some exemplary embodiments, stylus 120 additionally includes a wireless communication unit 30, e.g. an auxiliary channel with Bluetooth communication, near field communication (NFC), radio frequency (RF) communication using module 23 of host 22. In some exemplary embodiments, host 22 or circuit 25 instructs stylus 120 to update or configure its transmission protocol based on analysis and reports from circuit 25 and host 22.

Method for Identifying Error in Tip Status

Figure 2:
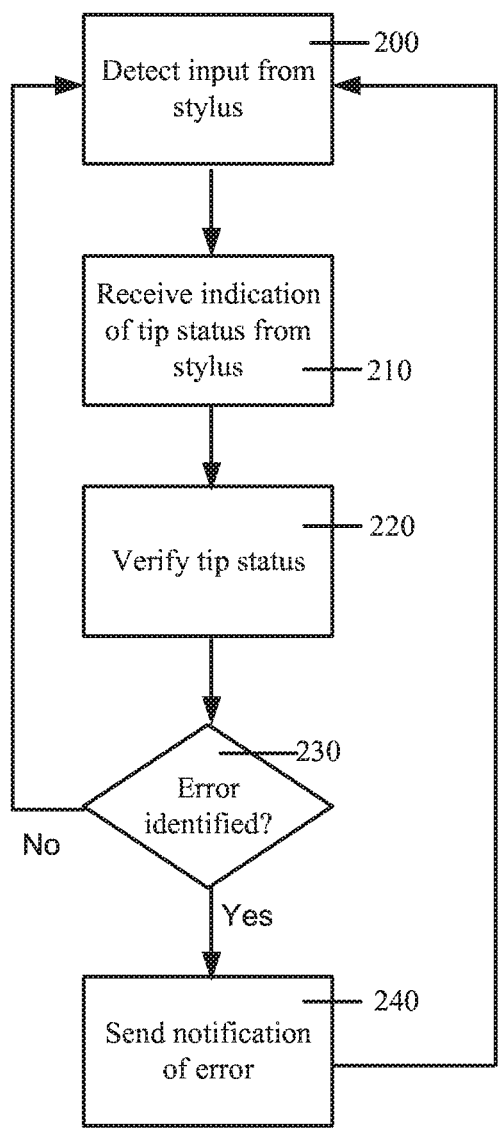
FIG. 2 is a simplified flowchart of an exemplary method for identifying an error in a tip status indication in accordance with some embodiments of the present disclosure.

Reference is now made to FIG. 2, which is a simplified flowchart of an exemplary method for identifying an error in a tip status indication from a stylus in accordance with some embodiments of the present disclosure.

In 200, the digitizer sensor detects input from the stylus on an ES wireless communication channel between the stylus and digitizer sensor. The digitizer sensor uses this input to determine the position of the stylus. The input signal may include additional modulated and/or encoded information.

In 210, an indication of the tip status is received from the stylus. The indication shows whether the stylus considers itself to be in contact with the digitizer sensor (i.e. touch mode) or hovering above the digitizer sensor (i.e. hover mode).

In some cases 200 and 210 are performed during the same transmission. The stylus position is determined from a pressure data transmission.

The tip status is received at the digitizer sensor on a wireless downlink signal from the stylus, for example the ES signal detected by the digitizer sensor. In other embodiments, the tip status is sent by the stylus to the digitizer sensor using a different type of wireless signal, for example a Bluetooth signal. The received wireless signal is processed (e.g. demodulated and/or decoded) to extract the tip status from the wireless signal.

Figure 3A:
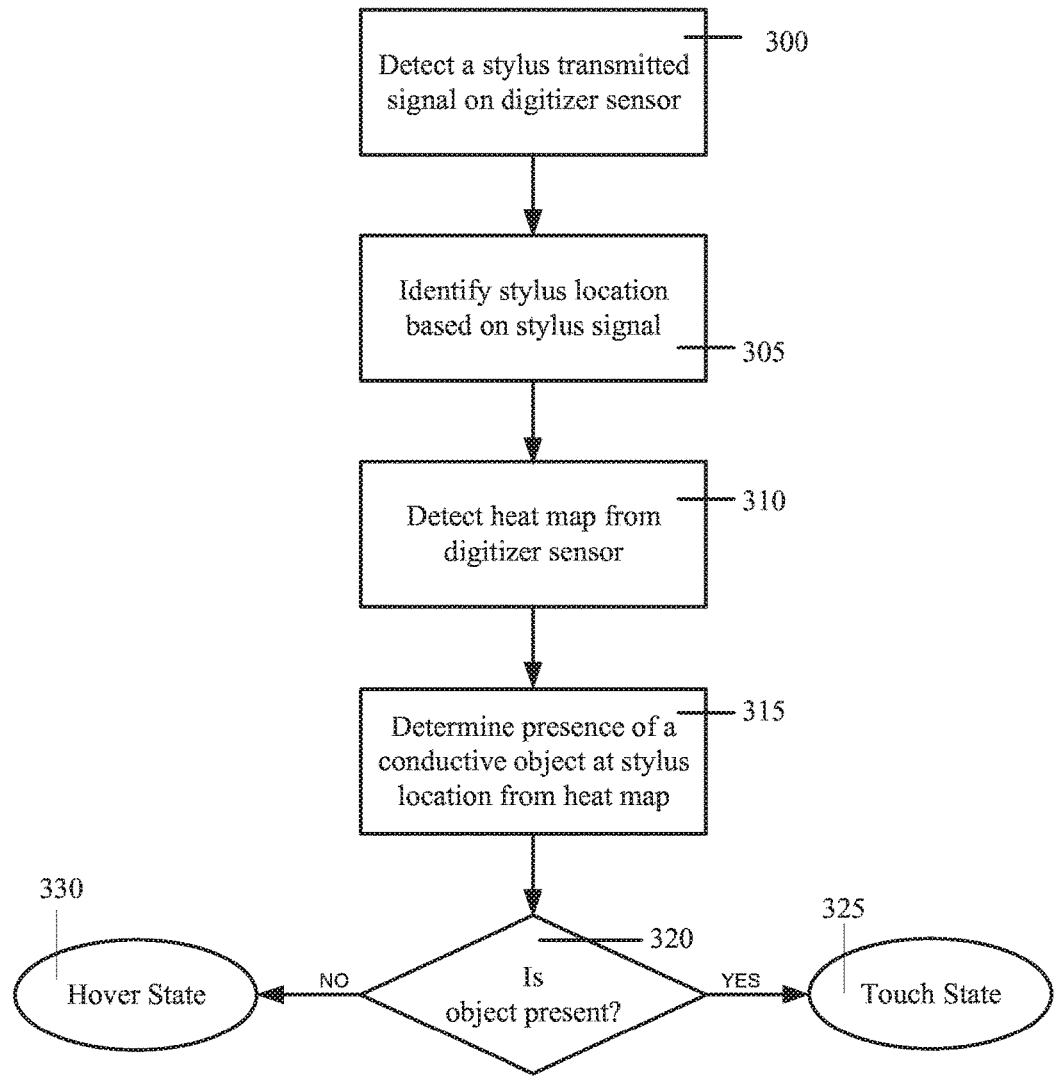
FIGS. 3A and 3B are simplified flowcharts of methods for stylus touch detection using a digitizer sensor, in accordance with respective embodiments of the present disclosure.
Figure 3B:
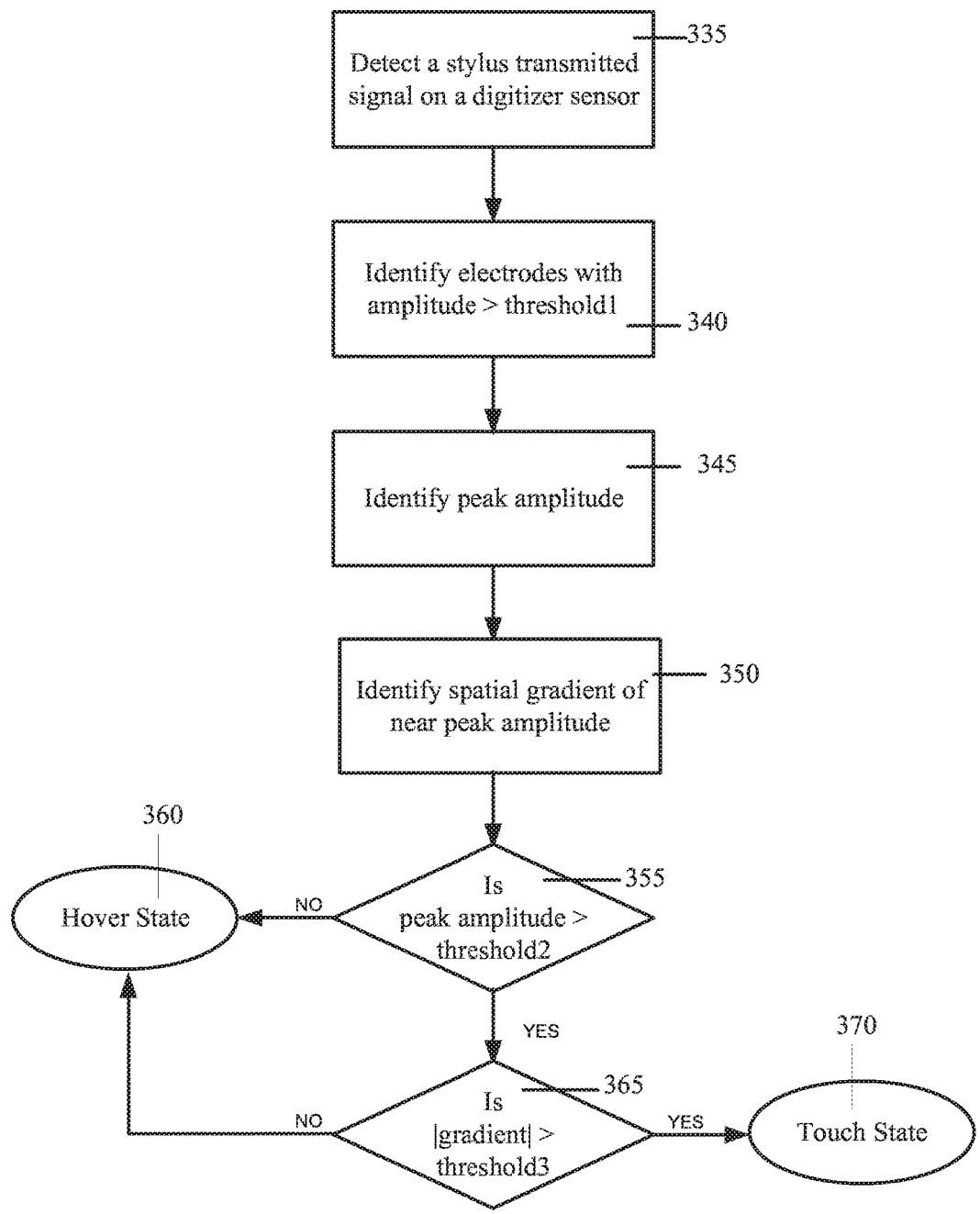

In 220, the tip status indication received from the stylus is verified by analyzing a signal detected by the digitizer sensor to determine the distance between the stylus and the digitizer sensor. The shape of the signal varies with the tip physical shape. Determining the distance between the stylus and digitizer sensor may be done by any means known in the art, such as matched filtering or pattern matching. FIGS. 3A and 3B show exemplary methods of determining, at the digitizer, when the stylus is touching the digitizer screen using heat map analysis and signal peak/gradient analysis respectively.

Typically, when the stylus is close to the digitizer sensor, the detected ES signal is relatively strong and localized. As the distance between the stylus and the digitizer sensor increases, the signal amplitude decreases and the signal becomes more dispersed. The analysis may compare the digitizer sensor outputs to specified parameters in order to determine from the detected signal amplitude and/or spatial gradient whether the distance of the stylus from the digitizer sensor exceeds a certain limit (in which case the stylus is not touching the digitizer screen). Alternately, contact between the stylus and the digitizer screen is determined during mutual capacitive detection (or self-capacitive detection) by the digitizer screen. The presence of a conductive portion of the tip on the digitizer screen may produce an effect similar to the effect detected during finger touch. Due to the relatively small diameter of the tip as compared to a finger, the presence of the conductive tip may only be detectable while the tip is touching the digitizer screen. Optionally a threshold on amplitude of the effect due to the stylus is defined and output above the threshold is used as an indication that the stylus is touching the digitizer screen. Thus, even if the digitizer is able to detect the stylus at a few millimeter hover, it may set a threshold to define if the stylus is touching the screen or not.

In 230 an error is identified in the tip status when:
  i) The stylus indicates it is in touch mode while the digitizer sensor does not detect contact with the stylus; and
  ii) The stylus indicates it is in touch mode while the digitizer sensor detects contact with the stylus.

In 240, when an error is identified a notification of the error is sent from the digitizer circuitry to the host and/or from the digitizer circuitry directly to the stylus. The error notification may trigger other activities in the stylus, digitizer sensor and/or host.

Typically, an error notification is sent to the stylus on a wireless uplink channel. The error notification may include instructions to the stylus to recalibrate its status and/or to perform other actions programmed into the stylus (such as changing mode of operation). The wireless uplink channel may be the ES channel between the digitizer sensor and the stylus, or a different type of wireless channel such as BT or NFC.

In another example, an error notification is sent from the host to the user (e.g. the error notification is displayed on a screen associated with the digitizer sensor) so that the user may calibrate the stylus manually or take some other action such as replacing the stylus or extracting and reinserting the tip.

In yet another example, when an error is identified the digitizer circuitry modifies its threshold, temporarily or permanently, for stylus tip state. Since the stylus typically has multiple pressure codes, the new "0" code (indicating hover) may be reset to the current pressure code transmitted by the stylus. For example, if the stylus is transmitting code "100" and it has 256 codes, the digitizer circuitry may set "100" as the "0" code and stretch codes "100-255" to be in the range of 0-255. In order to avoid reliability problems, the digitizer circuitry may reset the pressure codes when the stylus runs its internal calibration procedure.

Referring back to FIG. 1, an exemplary embodiment of identifying an error in a tip status indication using computing device 100 is now described. Digitizer sensor 50 detects input from a stylus as described above and may also detect a conductive tip of the stylus by mutual capacitance or self-capacitance detection. Electrodes or conductive strips 58 typically detect an ES signal from the stylus.

Digitizer circuitry 25 with stylus detection engine 27 receives and decodes an indication of tip status (i.e. touch or hover) from a stylus. The tip status may be received on an ES downlink signal from the stylus.

In some embodiments of the disclosure, host 22 includes wireless communication module 23 for wireless communication with the stylus over one or more different types of wireless channels, such as Bluetooth, NFC and RF. The tip status indicator may be received over any of the wireless channels supported by module 23 and, similarly, the error notification may be sent to the stylus over any of the supported wireless channels.

Optionally, the tip status indicator and error notification are sent on different types of wireless signals. For example, the tip status indication may be modulated onto the ES signal from the stylus and the error notification may be sent to the stylus over a Bluetooth channel.

Typically, tip status information modulated onto the wireless downlink signal is deciphered on the digitizer level. Digitizer circuitry 25 and/or host 22 perform all necessary signal processing and analysis operations, including but not limited to:
  i) Processing wireless signals received from the stylus to determine the tip status indicated by the stylus;
  ii) Analyzing signals based on mutual capacitive detection or self capacitive detection to determine whether the stylus is touching the digitizer sensor or screen.
  iii) Comparing the tip status indicator with the result of the analysis to identify errors in the tip status indicator; and
  iv) Sending notifications of identified errors to the stylus. The notifications may include instructions to the stylus, such as an instruction to recalibrate.

Optionally, some or all of the above operations are performed by a host associated with the digitizer sensor.

Touch Detection at Digitizer

Reference is now made to FIGS. 3A-3B, which are simplified flowcharts of methods for stylus touch detection using a digitizer sensor, in accordance with respective embodiments of the present disclosure.

FIG. 3A illustrates stylus touch detection using mutual capacitive detection or self-capacitive detection. With this method, stylus detection engine 27 detects the stylus location using the stylus signal detected by the digitizer sensor. During mutual or self capacitive detection, a heat map is detected and output at that location is analyzed to search for an effect due to presence of the stylus tip. FIG. 3A illustrates an example in which the effect due to the presence of the stylus tip is a peak in the heat map. If a peak in the heat map is identified in the vicinity of the determined location of the stylus, the stylus may be touching the digitizer screen. Otherwise, the stylus may be considered to be in hover state.

In 300, the signal transmitted by the stylus (e.g. ES signal) is detected on the digitizer sensor. In 305, the stylus location is identified from the detected signal.

In 310, the digitizer sensor heat map is detected. In 315, the presence of a conductive object already identified in the stylus location is determined, typically by detecting a negative peak in the heat map at the stylus location. If the object is present, the stylus is considered to be in touch 325. If the object is not present, the stylus is considered to be in hover 330.

Typically, capacitive coupling between tip of the stylus and the digitizer sensor is weak due to the relatively small diameter of the stylus tip in relation to the pitch of the digitizer sensor conductive strips. For this reason, a peak in the heat map due to the stylus touching the digitizer sensor is expected to have a relatively low amplitude and may be difficult to detect in a noisy environment. When the stylus is hovering, the coupling is significantly weak and may be practically undetectable. In some embodiments, 315 includes calculating a confidence level that a peak due to the presence of a conductive object exists on the heat map. Only if the confidence level is above a threshold is the stylus determined to be detectable by mutual capacitive detection. Detection of the stylus tip based on mutual capacitive detection may be used as an indication that the stylus is touching the digitizer screen.

FIG. 3B illustrates stylus touch detection by analyzing the stylus ES signal detected by the digitizer sensor. Contact between the stylus and the digitizer sensor is determined based on the amplitude and/or spatial gradient of the detected signal. The logic used for the determination is dependent on the tip physical shape. FIG. 3B illustrates a typical example in which the signal is weak and spatially wide when the stylus is hovering.

In 335, stylus detection engine 27 detects the signal transmitted by the stylus on the digitizer sensor. In 340, electrodes 58 providing output with an amplitude above a specified threshold (threshold_1) are identified. In 345, the peak amplitude is identified.

In 350, the spatial gradient near the peak amplitude is identified. In 355, the peak amplitude is compared to threshold 2. If the peak amplitude is not above threshold 2, the stylus is determined to be in hover 360. If the peak amplitude is above threshold 2 and the magnitude of spatial gradient is above threshold 3, the stylus is determined to be in touch 370. If the peak amplitude is above threshold 2 and the magnitude of spatial gradient is not above threshold 3 the stylus is determined to be in hover 360.

Stylus

Figure 4:
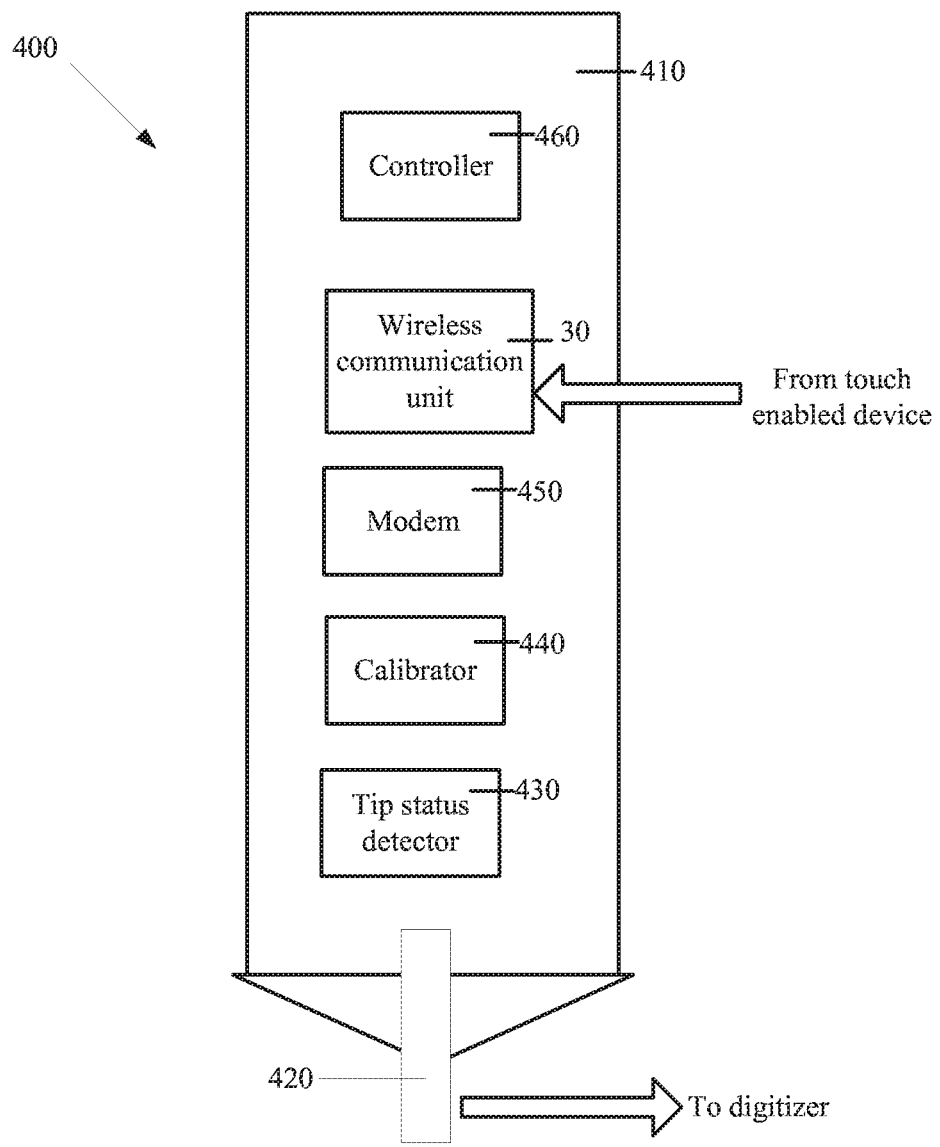
FIG. 4 is a simplified block diagram of a stylus in accordance with some embodiments of the disclosure.

Reference is now made to FIG. 4, which is a simplified block diagram of a stylus in accordance with some embodiments of the disclosure. Stylus 400 includes a housing 410, a tip 420, a tip status detector 430, a calibrator 440, a modem 450 and wireless communication unit 30. Stylus 410 may include a tip modem and driver connected to tip 420.

Tip status detector 430 detects whether the tip is in touch or hover mode, typically based on the mechanical position of the tip. For example, the stylus may contain a pressure sensor or elastic material which detects the pressure when the tip is retracted into the stylus (as expected during touch mode). In another example, the tip location within the stylus is determined using an optical sensor.

Modem 450 modulates the tip status indicator information onto the wireless signal sent to the digitizer.

Modem 450 also obtains error notifications from a touch enabled device by demodulating signals received by wireless communication unit 30 on an uplink channel, such as BT or NFC. Alternatively, the error notification may be received via tip 420 using the ES channel.

Typically, stylus 400 additionally includes a controller, such as an ASIC, which performs the processing operations needed for recalibration of the stylus tip, including applying control logic to stylus components such as: tip status detector 430, calibrator 440, modem 450, wireless communication unit 30 and/or a tip modem and driver.

During recalibration, a current position of the tip may be defined as the position of the tip while no pressure is applied on the tip, and a pre-defined additional force of the tip toward the housing is required to switch to a touch mode.

Figure 5:
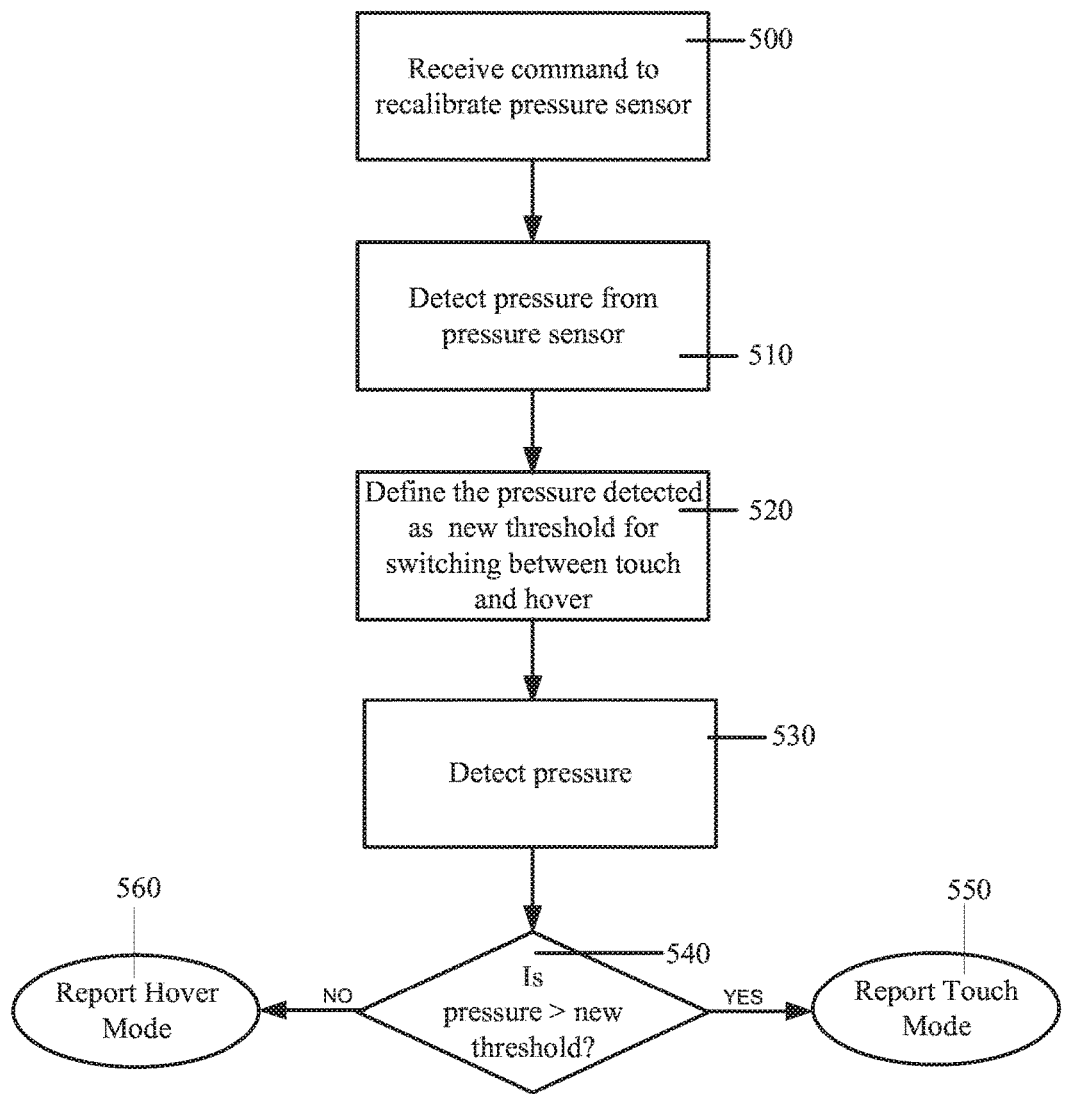
FIG. 5 is a simplified flowchart of a method for recalibration of the pressure sensor by the stylus, in accordance with some embodiments of the disclosure.

Reference is now made to FIG. 5, which is a simplified flowchart of a method for recalibration of the pressure sensor by the stylus, in accordance with some embodiments of the disclosure. After being commanded to recalibrate the pressure sensor, the stylus updates the threshold used to determine whether it is in touch or hover mode.

In 500, a command to recalibrate the pressure sensor is received at the stylus. In 510, the pressure on the stylus tip is detected by the pressure sensor. In 520, the detected pressure (or alternatively the detected pressure plus a margin) is set as the new threshold for switching between touch and hover modes. In 530, the pressure sensor continues to detect pressure on the stylus. In 540-560, the stylus touch status (hover or touch) is reported based on the new threshold.

According to some exemplary embodiments, there is provided a method comprising: detecting input from a stylus with a digitizer sensor via an electrostatic (ES) wireless communication channel between the stylus and the digitizer sensor; receiving an indication of a tip status from the stylus, wherein the tip status is hover or touch; verifying the tip status based on the input detected with the digitizer sensor; and identifying an error in the indication based on the verifying; and sending at least one notification of the error.

Optionally, verifying the tip status includes analyzing a spread of the input on a plurality of electrodes at the digitizer sensor to determine when the stylus is touching a screen of the digitizer sensor.

Optionally, verifying the tip status includes determining when the stylus is in contact with a digitizer screen by mutual capacitive detection of the input signal.

Optionally, the method further includes receiving a wireless downlink signal from the stylus and processing the received wireless signal to determine the tip status.

Optionally, the wireless signal is the ES signal. Alternately or additionally, the wireless signal is received over a second wireless communication channel that is other than the electrostatic communication channel (such as a BT channel).

Optionally, the notification is sent to the stylus by a wireless uplink signal.

Optionally, the notification(s) include instructions to the stylus to calibrate a pressure sensor which detects pressure on the tip. Optionally, the notification(s) include further include instructions to the stylus to change operating mode.

Optionally, the notification(s) includes an alert message sent to a user.

Optionally, the notification(s) include a trigger message to trigger an action on the digitizer circuitry and/or host.

According to some exemplary embodiments, there is provided a device comprising: a digitizer sensor configured to detect input from a stylus; and a circuit configured to execute code instructions. The code instructions are for: receiving an indication of a tip status from the stylus, wherein the tip status is hover or touch; verifying the tip status based on input detected by said digitizer sensor; identifying an error in the indication based on the verifying; and sending a notification of the error.

Optionally, the digitizer sensor includes a electrodes configured to detect an ES signal from the stylus.

Optionally, the device further includes a mutual capacitive sensor adapted to detect contact between the stylus and a digitizer screen.

Optionally, the device further includes at least one wireless communication interface, wherein the circuit is adapted to send the notification to the stylus by wireless communication.

Optionally, the wireless communication interface is an ES interface adapted for ES communication with the stylus.

Optionally, the wireless communication interface includes an ES interface adapted for ES communication with the stylus and a second wireless communication interface for a second form of wireless communication with the stylus.

Optionally, the notification includes instructions to the stylus to calibrate a pressure sensor detecting pressure on the tip.

According to some exemplary embodiments, there is provided stylus comprising: a tip status detector adapted to detect a tip status of the stylus, wherein the tip status is hover or touch; a modem associated with the tip status detector, adapted to modulate a signal with the tip status and to demodulate a received wireless signal to obtain a notification of an error in tip status; and a calibrator associated with the demodulator, adapted to recalibrate the tip in response to the notification.

Optionally, the received wireless signal is an ES signal or a BT signal.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A method comprising:
   detecting input from a stylus with a digitizer sensor via an electrostatic (ES) wireless communication channel established between said stylus and said digitizer sensor, wherein the input indicates a first tip status of the stylist;
   receiving data transmitted by the stylus, wherein the data indicates a second tip status from the stylus, wherein the second tip status is hover or touch;
   comparing the second tip status with the first tip status;
   identifying an error in the data based on a difference between the first tip status and the second tip status; and
   sending a notification of the error to a user or to the stylus from a host computing device including the digitizer sensor, the notification providing instructions to the stylus for recalibrating the stylus to correct the error.

2. A method according to claim 1, further comprising verifying the tip status based on a parameter of the input detected with the digitizer sensor, wherein the parameter is other than the data, wherein the parameter is at least one of a spread and an amplitude of said input on a plurality of electrodes at said digitizer sensor.

3. A method according to claim 2, wherein said verifying comprises determining when said stylus is in contact with a digitizer screen by capacitive detection of said input signal.

4. A method according to claim 1, further comprising receiving a wireless downlink signal from said stylus and processing said received wireless signal to determine a tip status.

5. A method according to claim 4, wherein said wireless signal is received over a second wireless communication channel, the second wireless communication channel being other than the electrostatic communication channel.

6. A method according to claim 4, wherein said wireless signal is said ES signal.

7. A method according to claim 1, wherein said notification is sent to said stylus by a wireless uplink signal.

8. A method according to claim 1, wherein said notification comprises instructions to said stylus to calibrate a pressure sensor detecting pressure on said tip.

9. A method according to claim 1, wherein said notification comprises instructions to said stylus to change operating mode.

10. A method according to claim 1, wherein said notification comprises an alert message to a user.

11. A method according to claim 1, wherein said notification comprises trigger message to trigger an action by the host computing device.

12. A device comprising:
    a digitizer sensor configured to detect input from a stylus, wherein the input indicates a first tip status of the stylist; and
    a circuit configured to execute code instructions for:
       receiving data transmitted by the stylus, wherein the data indicates a second tip status from the stylus, wherein the second tip status is hover or touch;
       comparing the second tip status with the first tip status;
       identifying an error in the data based on a difference between the first tip status and the second tip status; and
       sending a notification of the error to a user or to the stylus, the notification providing instructions to the stylus for recalibrating the stylus to correct the error.

13. A device according to claim 12, wherein said digitizer sensor comprises a plurality of electrodes configured to detect an ES signal from said stylus.

14. A device according to claim 12, further comprising a capacitive sensor adapted to detect contact between said stylus and a digitizer screen.

15. A device according to claim 12, comprising at least one wireless communication interface, wherein said circuit is adapted to send said notification to said stylus by wireless communication.

16. A device according to claim 15, wherein said at least one wireless communication interface comprises an ES interface adapted for ES communication with said stylus.

17. A device according to claim 15, wherein said at least one wireless communication interface comprises a first wireless communication interface adapted for ES communication with said stylus and a second wireless communication interface for a second form of wireless communication with said stylus.

18. A device according to claim 12, wherein said notification comprises instructions to said stylus to calibrate a pressure sensor in the stylus configured to detect pressure on said tip.

19. A stylus comprising:
    a tip status detector adapted to detect a first tip status of said stylist and a second tip status of said stylus, wherein the second tip status is hover or touch;
    a processor for comparing the second tip status with the first tip status;

a modem associated with said tip status detector, adapted to modulate a signal with said tip status and to demodulate a received wireless signal to obtain a notification of an error in data associated with the second tip status, the error based on a difference between the first tip status and the second tip status; and a calibrator associated with said modem and said tip status detector, adapted to recalibrate said tip status detector in response to said notification, said notification providing instructions to the stylus for recalibrating the stylus to correct the error.

20. A stylus according to claim 19, wherein said received wireless signal is an ES signal.

* * * * *